Dec. 20, 1932. C. A. DAILEY 1,891,403
OPERATING MECHANISM FOR PUMPING OUTFITS AND THE LIKE
Filed Sept. 10, 1931
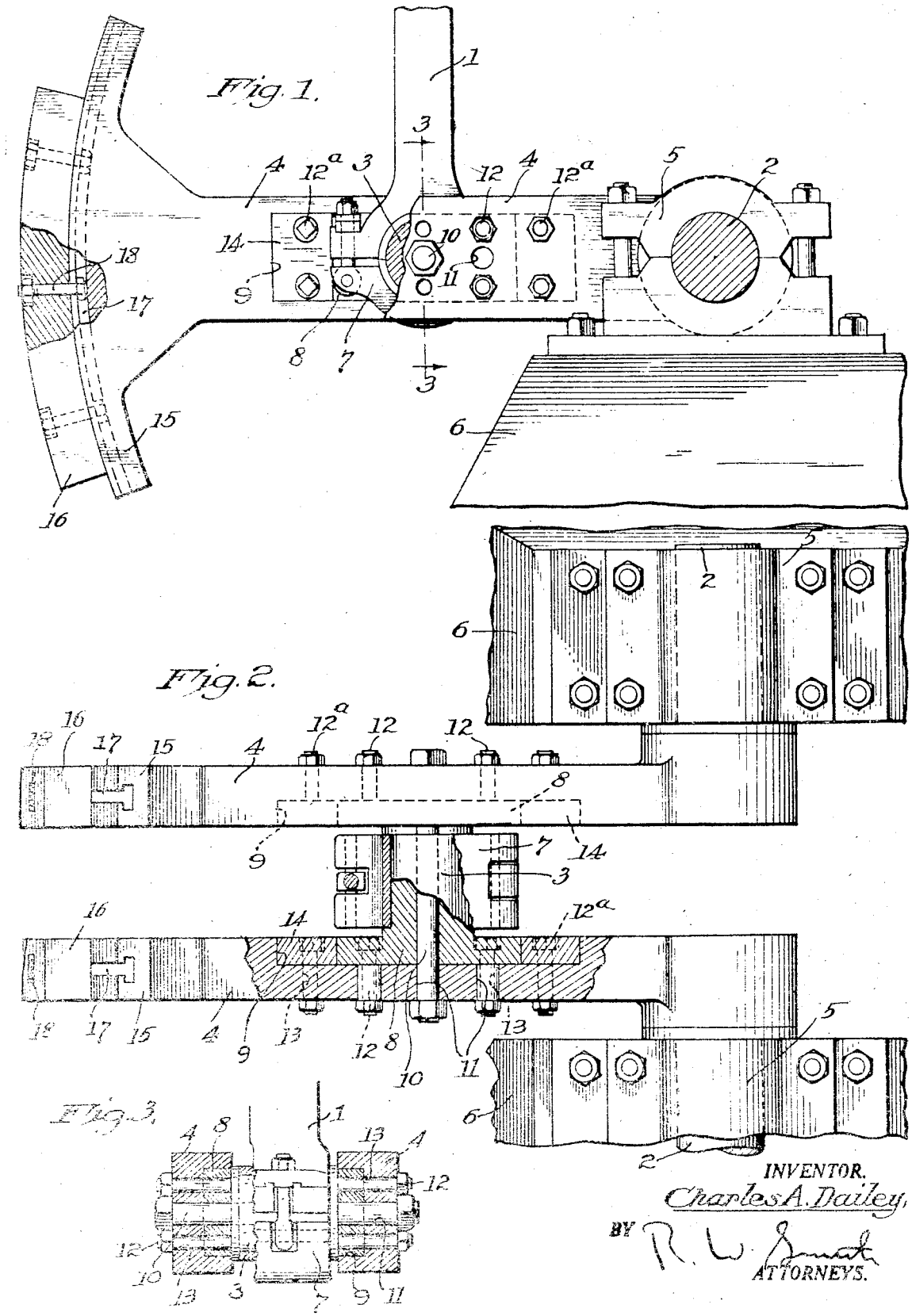
INVENTOR.
Charles A. Dailey,
BY
ATTORNEYS.

Patented Dec. 20, 1932

1,891,403

UNITED STATES PATENT OFFICE

CHARLES A. DAILEY, OF TORRANCE, CALIFORNIA

OPERATING MECHANISM FOR PUMPING OUTFITS AND THE LIKE

Application filed September 10, 1931. Serial No. 562,061.

This invention is an operating mechanism particularly applicable to pumping outfits for oil wells and the like, although of general utility for converting rotary to reciprocating motion. It is the object of the invention to equalize and counterbalance the load and thus avoid excessive wear and insure operation with minimum consumption of power.

More particularly it is the object of the invention to provide an operating mechanism comprising a cooperating crank and pitman, with the crank engaging both ends of the wrist pin upon which the pitman is journaled so as to equalize and distribute the operating strain throughout the length of the wrist pin, and the crank being preferably counterbalanced and adapted for adjustment of the counterbalance circumferentially of the crank so as to accurately counterbalance the load.

It is a further object of the invention to provide extremely simple but practical means for adjusting the wrist pin with relation to the crank so as to provide any desired stroke of the pitman, while at the same time accurately counterbalancing and equalizing the load.

Further objects of the invention will be readily understood from the following description of the accompanying drawing, in which:

Fig. 1 is a side elevation of the operating mechanism, partly broken away.

Fig. 2 is a top plan view, partly broken away.

Fig. 3 is a transverse section on the line 3—3 of Fig. 1.

The operating mechanism is illustrated applied to the pumping outfit of an oil well wherein a pitman 1 is reciprocated by a rotary drive shaft 2 so as to oscillate a usual walking beam (not shown), with the drive shaft adapted for rotation by any suitable operating means (not shown).

A crank which forms a part of the drive shaft carries a wrist pin upon which the pitman is journaled; and the present invention provides for equalizing the strain on the wrist pin by providing a double crank, with wrist pin 3 supported between the parallel arms 4—4 of the double crank, and the ends of shaft 2 beyond the respective crank arms journaled in bearings 5—5 which are mounted on transversely spaced supports 6—6. The pitman 1 which has a usual bearing 7 journaled on wrist pin 3, is thus supported between the parallel crank arms 4—4, so that the operating strain is uniformly distributed along the length of the wrist pin and the entire load is medially of the transverse spacing of bearings 5—5.

The wrist pin 3 is shiftable lengthwise of crank arms 4 so as to adjust the stroke of pitman 1, with said adjustment comprising an extremely simple but practical and sturdy construction. As an instance of this arrangement the wrist pin may be integral with supporting plates 8 which are slidable in guide recesses 9 extending along the inner surfaces of crank arms 4, with a bolt 10 preferably extending through the wrist pin and its supporting plates, and selectively received in bores 11 which are spaced along the crank arms 4, and bolts 12 preferably extending through the respective supporting plates 8 and selectively received in bores 13 which are similarly spaced along the length of the crank arms.

The bores 11 are preferably so spaced as to position the wrist pin with its supporting plates 8 either spaced medially of the length of guide recesses 9 or snugly engaging one end or the other of said recesses; and by means of additional bolts 12ª engaging corresponding bores 13, plates 14 may be removably mounted in each of the spaces between the ends of plates 8 and the ends of recesses 9 when plates 8 are positioned medially of the length of the recesses as shown in the drawing, or a pair of said removable plates may be mounted in each of the double spaces between the supporting plates and one end of the recesses in the pair of crank arms 4, when the wrist pin has been shifted so that the supporting plates snugly engage the opposite end of the recesses. The wrist pin is thus rigidly held in adjusted position without undue strain on the bolts, while at the same time providing for its ready adjustment to vary the stroke of pitman 1.

The operating mechanism is preferably counterbalanced, with said counterbalance circumferentially adjustable concentric with drive shaft 2 so as to accurately balance the load irrespective of the adjustment of wrist pin 3. For this purpose the outer ends of the pair of crank arms 4 may form arcuate guides 15 concentric with drive shaft 2, with identical concentric arcuate counterweights 16 adjustable along the respective guides and adapted to be securely held in adjusted position, as for example by forming shouldered grooves 17 in the guides, with bolts 18 extending through the counterweights and adapted to engage the shouldered grooves when the bolts are tightened, so that the counterweights may be adjusted in accordance with the position of wrist pin 3 and so as to exert the mean counterbalancing force in the medial plane of revolution of bearing end 7 of the pitman.

The invention thus provides an accurately counterbalanced and extremely simple but practical means for converting rotary motion to reciprocating motion, and comprising means for rigidly supporting an adjustable wrist pin between parallel arms of a double crank which is formed medially of a drive shaft, so as to uniformly distribute operating strain throughout the length of the wrist pin and position the connecting rod or pitman which is journaled on the wrist pin so that the operating strain is medially of the transverse spacing between the bearing supports for the respective ends of the drive shaft.

I claim:

1. In operating mechanism for converting rotary to reciprocating motion, a double crank comprising parallel arms having longitudinal guide recesses at their inner surfaces, a wrist pin having integral end supporting plates adapted for sliding reception in the guide recesses for adjustment of the wrist pin longitudinally of the double crank, means for securing the supporting plates in adjusted position in the guide recesses, plates adapted for removable mounting in the guide recesses between the ends of the supporting plates and the ends of the recesses, and a connecting rod journaled on the wrist pin.

2. In operating mechanism for converting rotary to reciprocating motion, a double crank comprising parallel arms having longitudinal guide recesses, a wrist pin having ends adapted for sliding reception in the guide recesses for adjustment of the wrist pin longitudinally of the double crank, a bolt projecting from the wrist pin ends and adapted for selective reception in cooperating bores spaced along the length of the guide recesses, spacer plates, means carried by said spacer plates selectively engaging the aforementioned bores for removably mounting the spacer plates in the guide recesses between the wrist pin ends and proximate ends of the recesses, and a connecting rod journaled on the wrist pin.

3. In operating mechanism for converting rotary to reciprocating motion, a crank having a longitudinal guide recess, a wrist pin having an end adapted for sliding reception in the guide recess for adjustment of the wrist pin longitudinally of the crank, means for securing the wrist pin end in adjusted position along the guide recess, a plate adapted for mounting in the guide recess between the wrist pin end and a proximate end of the guide recess, and a connecting rod journaled on the wrist pin.

4. In operating mechanism for converting rotary to reciprocating motion, a crank having a longitudinal guide recess, a wrist pin having an end adapted for sliding reception in the guide recess for adjustment of the wrist pin longitudinally of the crank, a bolt projecting from the wrist pin ends adapted for selective reception in cooperating bores spaced along the length of the guide recess whereby a space may be left between one or both sides of the wrist pin end and proximate ends of the guide recess, spacer plates, means carried by said spacer plates selectively engaging the aforementioned bores for removably mounting one or both of said spacer plates in said spaces, and a connecting rod journaled on the wrist pin.

In testimony whereof I have affixed my signature.

CHARLES A. DAILEY.